United States Patent
Fujii et al.

(10) Patent No.: US 9,180,366 B2
(45) Date of Patent: Nov. 10, 2015

(54) GAME SYSTEM, GAME PROCESSING METHOD, GAME APPARATUS, AND COMPUTER-READABLE STORAGE MEDIUM HAVING STORED THEREIN GAME PROGRAM

(75) Inventors: Hideki Fujii, Kyoto (JP); Daisuke Kageyama, Kyoto (JP); Masato Mizuta, Kyoto (JP); Atsushi Yamazaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 445 days.

(21) Appl. No.: 13/605,317

(22) Filed: Sep. 6, 2012

(65) Prior Publication Data

US 2013/0316815 A1 Nov. 28, 2013

(30) Foreign Application Priority Data

May 22, 2012 (JP) ................................. 2012-116715

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/20 | (2014.01) |
| A63F 13/40 | (2014.01) |

(52) U.S. Cl.
CPC .................. *A63F 13/06* (2013.01); *A63F 13/10* (2013.01); *A63F 2300/301* (2013.01); *A63F 2300/6045* (2013.01); *A63F 2300/6676* (2013.01)

(58) Field of Classification Search
USPC ....................................... 463/1, 20, 25, 30, 31
See application file for complete search history.

(56) References Cited

U.S. PATENT DOCUMENTS 6,409,596 B1 * 6/2002 Hayashida et al. ............. 463/31

FOREIGN PATENT DOCUMENTS

JP 2001-70649 3/2001

* cited by examiner

*Primary Examiner* — Adetokunbo O Torimiro
(74) *Attorney, Agent, or Firm* — Nixon & Vanderhye PC

(57) ABSTRACT

In a game system, a first game screen obtained by a first virtual camera taking an operation target object in a first direction is displayed on a first display section, and a second game screen obtained by a second virtual camera taking the operation target object in a second direction substantially opposite to the first direction is displayed on a second display section different from the first display section. The operation target object is controlled to move in a predetermined direction in a virtual space in accordance with an input direction detected based on input to an operation section. At a predetermined timing based on game processing, a direction in which the first virtual camera is set as seen from the operation target object and a direction in which the second virtual camera is set as seen from the operation target object are switched therebetween.

18 Claims, 13 Drawing Sheets

F I G. 8
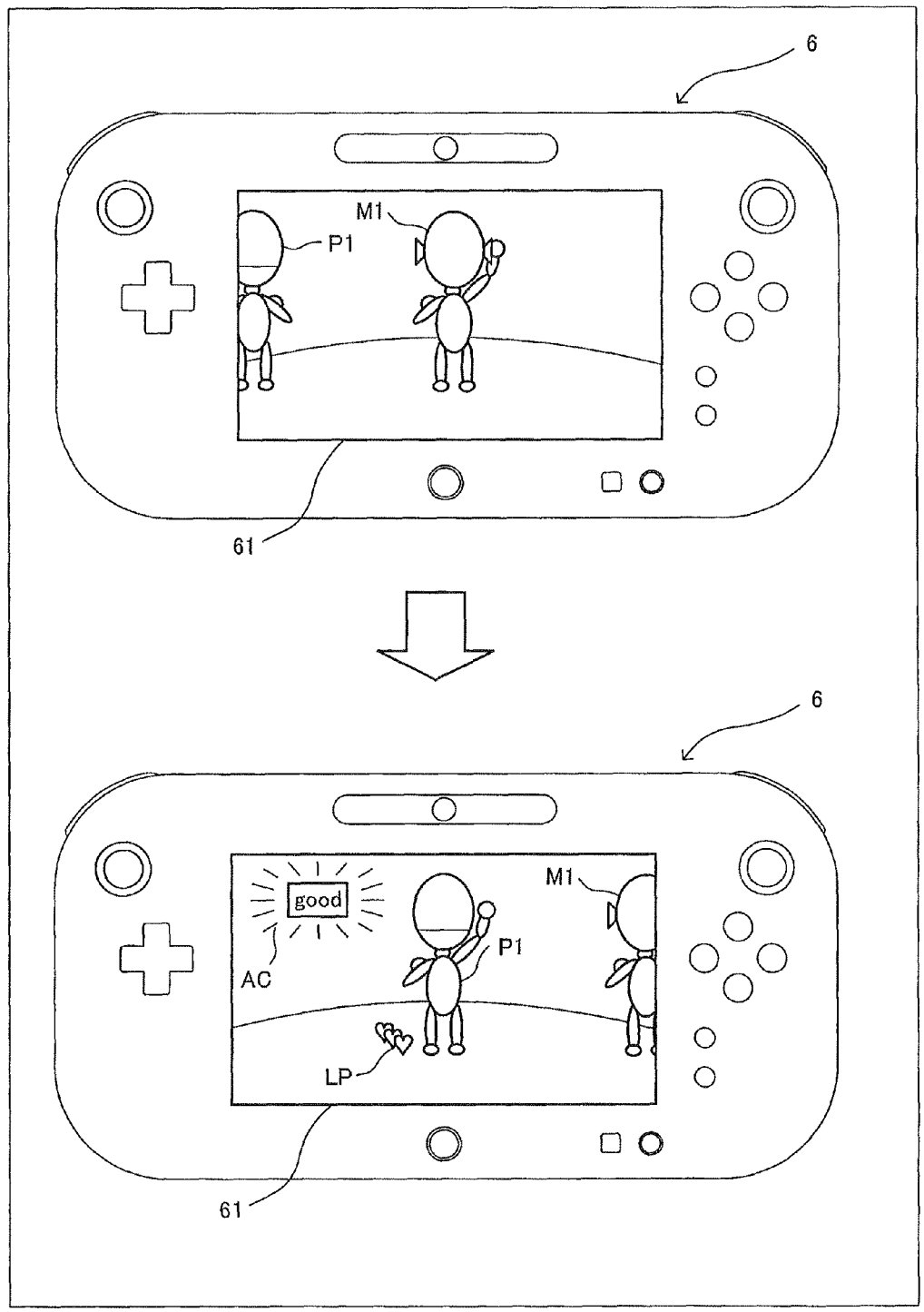

GAME SYSTEM, GAME PROCESSING METHOD, GAME APPARATUS, AND COMPUTER-READABLE STORAGE MEDIUM HAVING STORED THEREIN GAME PROGRAM

CROSS REFERENCE TO RELATED APPLICATION

The disclosure of Japanese Patent Application No. 2012-116715, filed on May 22, 2012, is incorporated herein by reference.

FIELD

The exemplary embodiments relate to a game system, a game processing method, a game apparatus, and a computer-readable storage medium having stored therein a game program, and more particularly, to a game system, a game processing method, a game apparatus, and a computer-readable storage medium having stored therein a game program that are capable of changing the play style for game in the middle of play of a game.

BACKGROUND AND SUMMARY

Conventionally, a game is known in which a character is displayed on one video monitor (display screen), and by a player moving an operation device, the character moves in a direction of the movement of the operation device as seen from the player (for example, if a player moves the operation device rightward, the character moves rightward as seen from the player).

However, in the above conventional game, although operation is easy because a character moves in accordance with the direction as seen from a player, this play style is constant. This is simple in the sense of game, and the game operation lacks variation.

Therefore, a main object of the exemplary embodiments is to provide a game system, a game processing method, a game apparatus, and a computer-readable storage medium having stored therein a game program that are capable of changing the play style for game in the middle of play of a game, thereby realizing game operation full of variety.

The above object is achieved by the following configuration, for example.

A game system according to one aspect of the exemplary embodiments includes: an operation device having an operation section and a first display section; an input direction detection section; an object control section; a first virtual camera setting section; a second virtual camera setting section; a first image generation section; a second image generation section; a first image transmission section; a second image output section; and a viewpoint switching section. The input direction detection section detects an input direction that is designated, based on input to the operation section. The object control section, in accordance with the input direction, performs control such that an operation target object in a virtual space moves in a predetermined direction in the virtual space associated with the input direction. The first virtual camera setting section sets a first virtual camera for taking the operation target object in a first direction. The second virtual camera setting section sets a second virtual camera for taking the operation target object in a second direction which is substantially opposite to the first direction. The first image generation section generates a first game screen, based on the first virtual camera. The second image generation section generates a second game screen, based on the second virtual camera. The first image transmission section transmits the first game screen to the operation device. The second image output section outputs the second game screen to a second display device which is a device separate from the first display section. The viewpoint switching section, at a predetermined timing based on game processing, in the virtual space, replaces a direction in which the first virtual camera is set as seen from the operation target object and a direction in which the second virtual camera is set as seen from the operation target object with each other.

According to the above configuration, the first game screen (first image) displayed on the first display section and the second game screen (second image) displayed on the second display section are images of the operation target object in a virtual space taken from viewpoints opposite to each other, and the viewpoints are switched at a predetermined timing. In addition, the operation target object is controlled so as to move in a predetermined direction, in a virtual space, associated with an input direction designated by a player. Therefore, when the viewpoints are switched, the direction of movement of the operation target object as seen from a player are also switched. Thus, a player can enjoy game play with different operations while alternately viewing two game screens based on different viewpoints in accordance with the timing. That is, the play style for game is changed at a predetermined timing, whereby a player can enjoy game operation full of variety.

The viewpoint switching section may replace, in accordance with game progress, a direction in which the first virtual camera is set as seen from the operation target object and a direction in which the second virtual camera is set as seen from the operation target object with each other.

According to the above configuration, the play style for game is changed in accordance with progress of a game (that is, in the middle of a game), whereby a player can enjoy game operation full of variety.

The first image generation section may further generate an image shielding at least a part of an image of the virtual space taken by the first virtual camera, at a predetermined timing based on game processing.

According to the above configuration, since at least a part of an image of a virtual space displayed as the first game screen on the operation device is hidden at a predetermined timing, it is difficult for a player to play a game while viewing the first game screen, and the player is to play a game while viewing the second screen displayed on the second display device. Thus, it is possible to cause a player to change the play style for game at a predetermined timing. That is, it is possible to prompt a player to perform game operation using two screens while alternately viewing two game screens having different viewpoints.

The operation target object may be at least a part of a player object. The first virtual camera setting section and the second virtual camera setting section may perform setting as follows. That is, the first virtual camera setting section sets the first virtual camera such that the first virtual camera takes the operation target object from a viewpoint seeing the back of the player object. The second virtual camera setting section sets the second virtual camera such that the second virtual camera takes the operation target object from a viewpoint seeing the front of the player object. In this case, the object control section performs control such that the input direction is the same as a movement direction of the at least part of the player object as seen from the back, and the viewpoint switching section replaces the viewpoint seeing the back and the viewpoint seeing the front with each other, or reverses a direction of the player object.

According to the above configuration, an image taken from a viewpoint seeing the back of a player object is set as the first game screen, and an image taken from a viewpoint seeing the front of a player object is set as the second game screen. An input direction designated by a player is associated with a movement direction of an operation target object as seen from the back of the player object. Therefore, if the player performs game operation while viewing the first game screen, the player can easily perform operation because direction correspondence can be intuitively recognized. On the other hand, when the viewpoint is switched at a predetermined timing, an image displayed as the second game screen allows intuitive recognition of direction correspondence. Therefore, the player changes the play style by alternately viewing two game screens in order to perform game operation so as to allow intuitive recognition of direction correspondence. Thus, the player can enjoy game operation full of variety.

The operation section may include a stick section. In this case, the input direction detection section detects a stick input direction, based on an input to the stick section, and the object control section performs control such that the stick input direction apparently coincides with a movement direction of the at least part of the player object as seen from the back.

According to the above configuration, an input direction designated via the stick section by a player apparently coincides with a movement direction of the operation target object as seen from the back of a player object. Therefore, if the player operates the stick section while viewing an image taken from a viewpoint seeing the back of the player object, the player can easily perform operation because direction correspondence can be intuitively recognized.

The stick section may include a left stick section provided so as to be operable by the left hand of a player, and a right stick section provided so as to be operable by the right hand of a player. The operation target object may include a left object which is a part of the player object and is positioned on the left as seen from the back, and a right object which is a part of the player object and is positioned on the right as seen from the back. In this case, the input direction detection section detects a left stick input direction, based on an input to the left stick section, and detects a right stick input direction, based on an input to the right stick section. The object control section performs control such that the left stick input direction apparently coincides with a movement direction of the left object as seen from the back, and performs control such that the right stick input direction apparently coincides with a movement direction of the right object as seen from the back.

According to the above configuration, the left object positioned on the left of a player object as seen from the back is controlled by the left stick section which is operated by the left hand of a player, and the right object positioned on the right of the player object as seen from the back is controlled by the right stick section which is operated by the right hand of a player. Therefore, a player can perform intuitive game operation by operating those stick sections while viewing an image taken from a viewpoint seeing the back of the player object. On the other hand, if a player operates the stick sections while viewing an image taken from a viewpoint seeing the front of the player object, an input direction does not apparently coincide with an actual movement direction of the operation target object, and for example, since the right object controlled by the right stick section is apparently positioned on the left of the player object, it is difficult to intuitively determine by which input of the two stick sections the right object is controlled. Therefore, by combining operation of the two stick sections and switching of viewpoints, the difficulty level of game operation can be increased, and a player can enjoy game operation full of variety.

The game system may further include a game progress control section. The game progress control section progresses a game when movement of the operation target object controlled by the object control section is the same as predetermined movement that is set.

According to the above configuration, a player can progress a game by performing operation so as to cause the operation target object to perform a predetermined movement. Therefore, the player can enjoy game operation full of variety while changing the play style by selecting a game screen that allows easy operation, of the first game screen and the second game screen, in order to progress a game.

The game system may further include a timing determination section configured to determine whether or not a timing of an input to the operation section coincides with a predetermined timing that is set; and a movement direction determination section configured to determine whether or not the input direction detected by the input direction detection section is the same as a predetermined direction that is set. In this case, the game progress control section progresses a game when at least one of a determination result by the timing determination section and a determination result by the movement direction determination section is positive.

According to the above configuration, a player can progress a game by performing operation such that the timing and the direction of the movement of the operation target object coincides with a predetermined timing and a predetermined direction (action). Therefore, the player can enjoy game operation full of variety while changing the play style by selecting a game screen that allows intuitive recognition of direction correspondence and easy operation, of the first game screen and the second game screen, in order to progress a game.

The operation section may include a gyro sensor. In this case, the input direction detection section detects the input direction that is designated, based on the gyro sensor.

According to the above configuration, since the operation section includes a gyro sensor, a rotation direction of the operation device is detected. Therefore, a player can also control the movement of the operation target object by rotation of the rotation section, and the player can enjoy game operation full of variety.

In the above description, a game system is used for example as one aspect of the exemplary embodiments. However, the exemplary embodiments are also applicable to a game processing method, a game apparatus, a computer-readable storage medium having stored therein a game program.

According to the exemplary embodiments, it is possible to provide a game system, a game processing method, a game apparatus, and a computer-readable storage medium having stored therein a game program that are capable of changing the play style for game in the middle of play of a game, thereby realizing game operation full of variety.

These and other objects, features, aspects and advantages of the exemplary embodiments will become more apparent from the following detailed description when taken in conjunction with the accompanying drawings.

BRIEF DESCRIPTION OF THE DRAWINGS

FIG. 8 is a schematic diagram showing a non-limiting example of an image displayed on the display screen of the terminal device 6;

DETAILED DESCRIPTION OF NON-LIMITING EXAMPLE EMBODIMENTS

Figure 1:
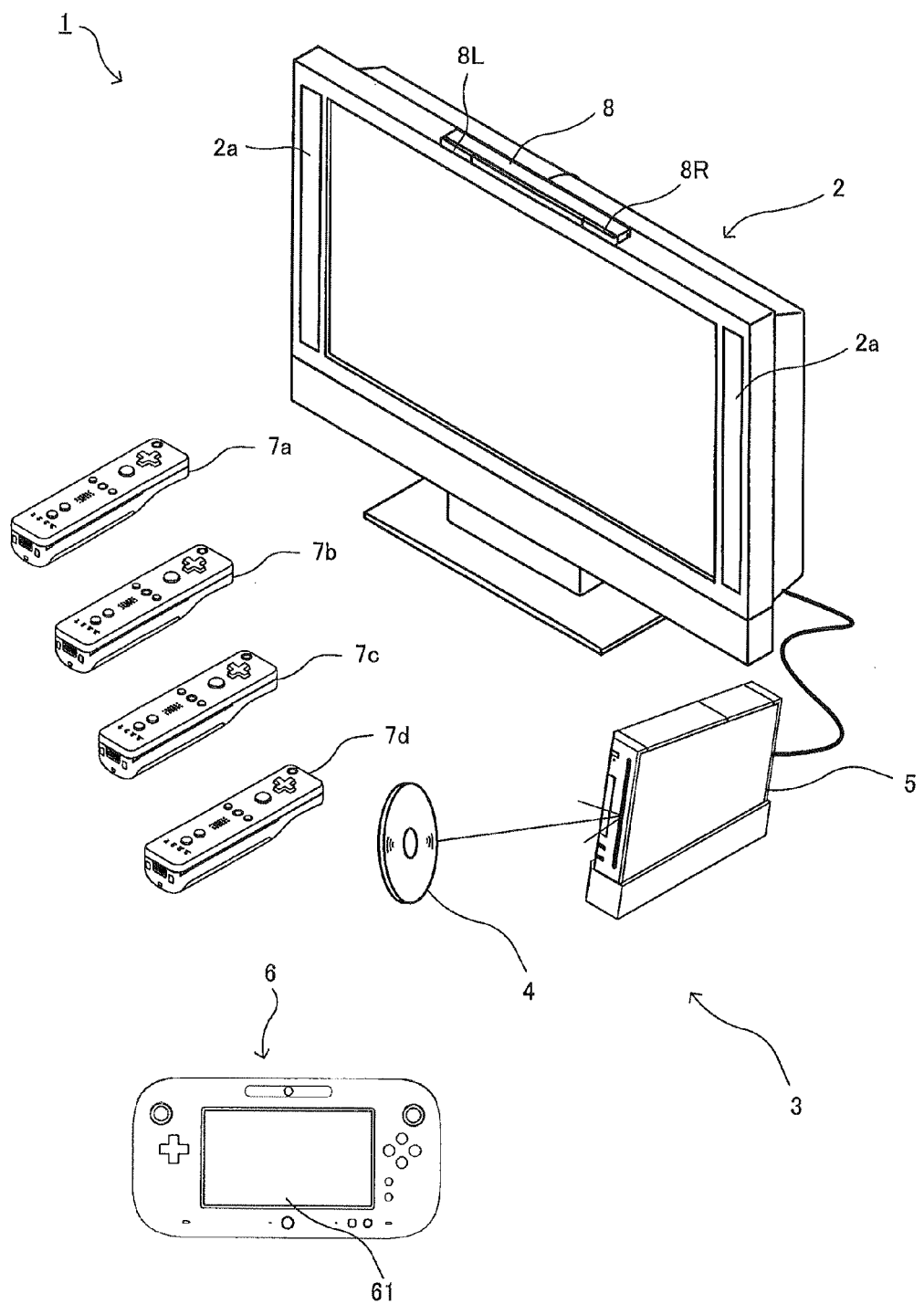
FIG. 1 is an external view showing a non-limiting example of a game system 1 according to an exemplary embodiment.

With reference to FIG. 1, a game system according to an exemplary embodiment will be described.

As shown in FIG. 1, a game system 1 includes a household television receiver (hereinafter, referred to as a monitor) 2 which is an example of display means, and a stationary game apparatus 3 connected to the monitor 2 via a connection cord. The monitor 2 includes loudspeakers 2a. The game apparatus 3 includes an optical disc 4, a game apparatus body 5, a terminal device 6, and controllers 7a to 7d (hereinafter, these may be simply referred to as a controller 7 when they need not to be distinguished from each other).

The optical disc 4 has stored therein an information processing program (typically, a game program) to be executed by the game apparatus body 5.

The monitor 2 displays, on its display screen, a game image outputted from the game apparatus body 5. The monitor 2 includes the loudspeakers 2a. The loudspeakers 2a each output a game sound outputted from the game apparatus body 5.

The game apparatus body 5 performs game processing and the like based on a game program or the like stored in the optical disc 4.

The controller 7 includes a plurality of operation sections (operation buttons). The controller 7 transmits to the game apparatus body 5 operation data (controller operation data) and the like indicating an input state of the operation sections (whether each of the operation buttons has been pressed).

The terminal device 6 is a portable device that is small enough to be held by a user, and the user is allowed to move the terminal device 6 with hands, or place the terminal device 6 at any location. Although a specific structure of the terminal device 6 will be described later, the terminal device 6 includes an LCD (Liquid Crystal Display) 61 as a display screen, and an operation section (an analog stick 63, a gyro sensor 604, and the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment an LCD is used as a display screen, the terminal device 6 may include any other display screen, such as a display screen utilizing EL (Electro Luminescence), for example. Further, the terminal device 6 transmits, to the game apparatus body 5, operation data representing the content of an operation performed on the terminal device 6.

Figure 2:
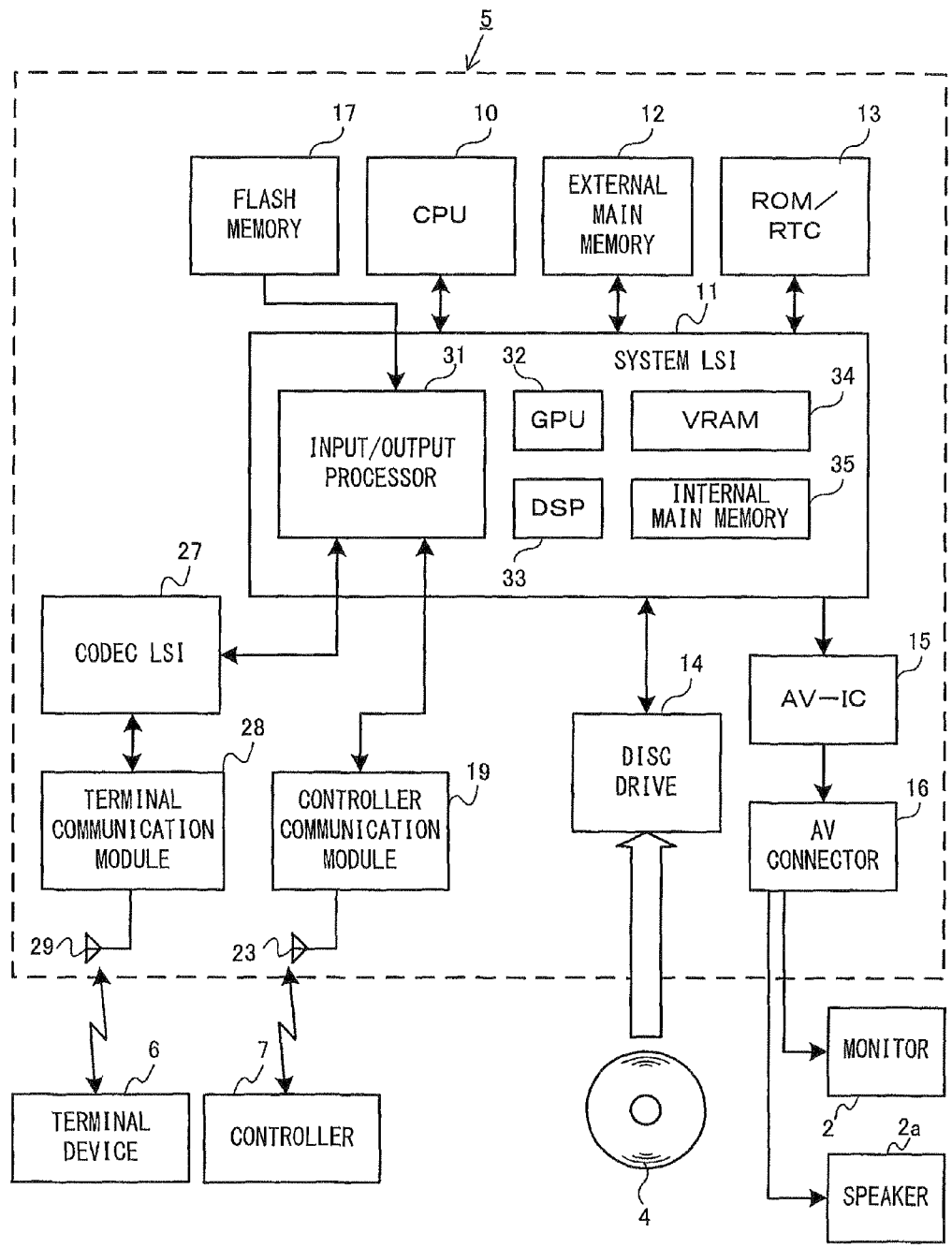
FIG. 2 is a functional block diagram showing a non-limiting example of a game apparatus body 5 shown in FIG. 1.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

In addition to the CPU 10, the external main memory 12, the ROM/RTC 13, the disc drive 14, and the AV-IC 15 are connected to the system LSI 11. The external main memory 12, which is a volatile memory, is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) supplied from the CPU 10. In the exemplary embodiment, the game apparatus body 5 generates both a game image to be displayed on the monitor 2 and a game image to be displayed on the terminal device 6. Hereinafter, the game image to be displayed on the monitor 2 is referred to as a "monitor game image", and the game image to be displayed on the terminal device 6 is referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2a of the monitor 2 and a game sound to be outputted from the loudspeakers of the terminal device 6 are generated. Hereinafter, the game sound to be outputted from the monitor 2 is referred to as a "monitor game sound", and the game sound to be outputted from the terminal device 6 is referred to as a "terminal game sound".

Among the image data and sound data generated by the game apparatus body 5, the image data and sound data to be outputted to the monitor 2 are read by the AV-IC 15. Through an AV connector 16, the AV-IC 15 outputs the read image data to the monitor 2 and outputs the read sound data to the loudspeakers 2a included in the monitor 2. Thereby, an image is displayed on the monitor 2, and a sound is outputted from the loudspeakers 2a.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to a flash memory 17, a controller communication module 19, and a codec LSI 27. The codec LSI 27 is connected to the terminal communication module 28.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer region of the internal main memory 35 or the external main memory 12.

The game apparatus body 5 is capable of transmitting/receiving image data, sound data and the like to/from the terminal device 6. The I/O processor 31 outputs data of a game image (terminal game image) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. It is noted that, in the exemplary embodiment, image data transmitted from the game apparatus body 5 to the terminal device 6 is used in a game, and if some delay occurs on an image to be displayed in a game, the operability of the game is adversely affected. Accordingly, the transmission of image data from the game apparatus body 5 to the terminal device 6 is performed so as to cause as little such delay as possible. Therefore, in the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (terminal game sound) generated by the DSP 33 to the terminal communication module 28 via the codec LSI 27. The codec LSI 27 performs a compression process on the sound data in a similar manner to that for the image data. Any compression technique may be adopted for the sound data. A compression method with a high compression rate and decreased deterioration of sound may be adopted. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represents control instructions for the components included in the terminal device 6, and the I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data. The data transmitted from the terminal device 6 are received by the terminal communication module 28 via the antenna 29. The operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

In another embodiment, some of the components of the game apparatus body 5 may be constituted as an extension device separated from the game apparatus body 5.

Figure 3:
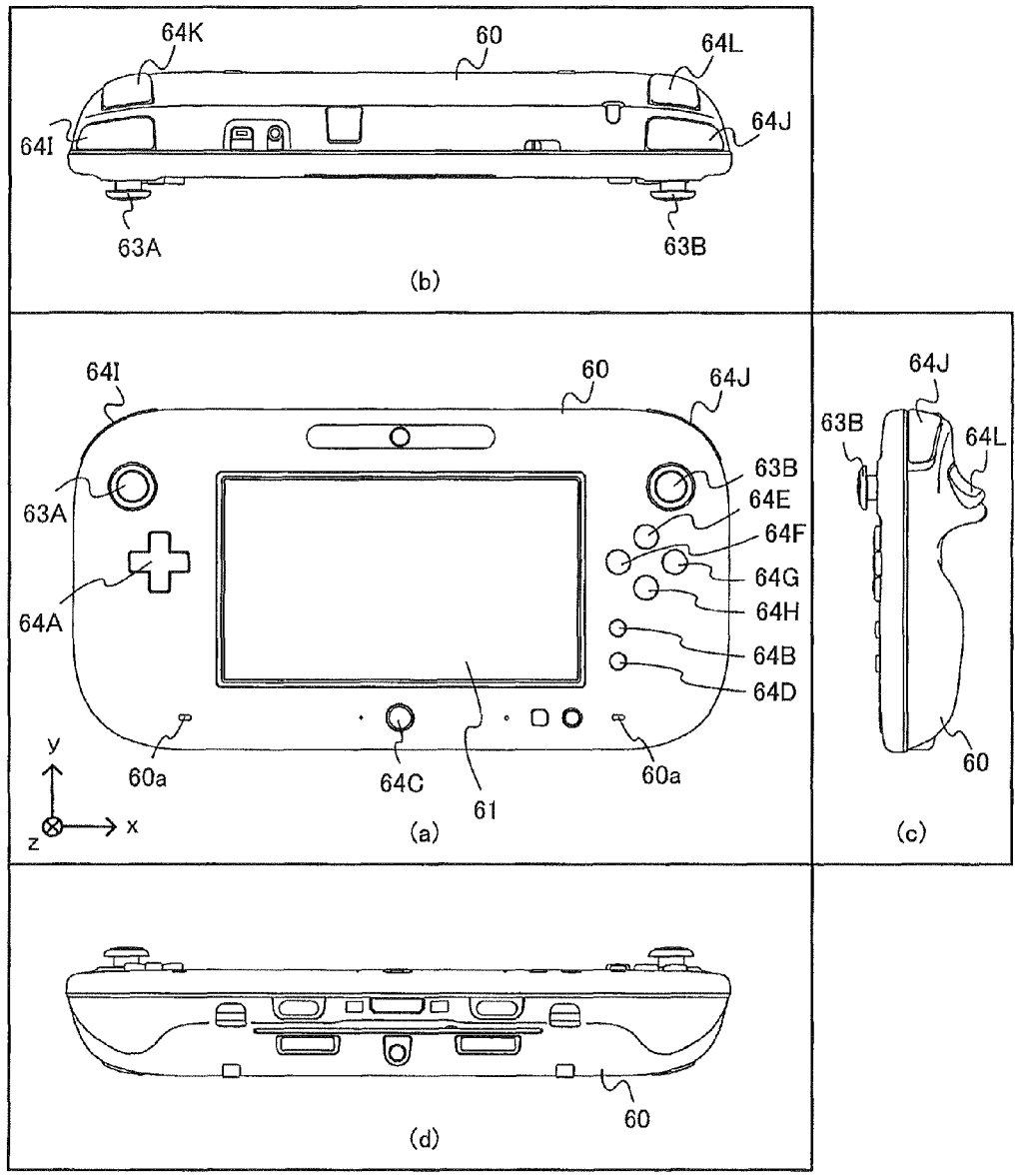
FIG. 3 is a diagram showing a non-limiting example of an external structure of a terminal device 6 shown in FIG. 1.
Figure 4:
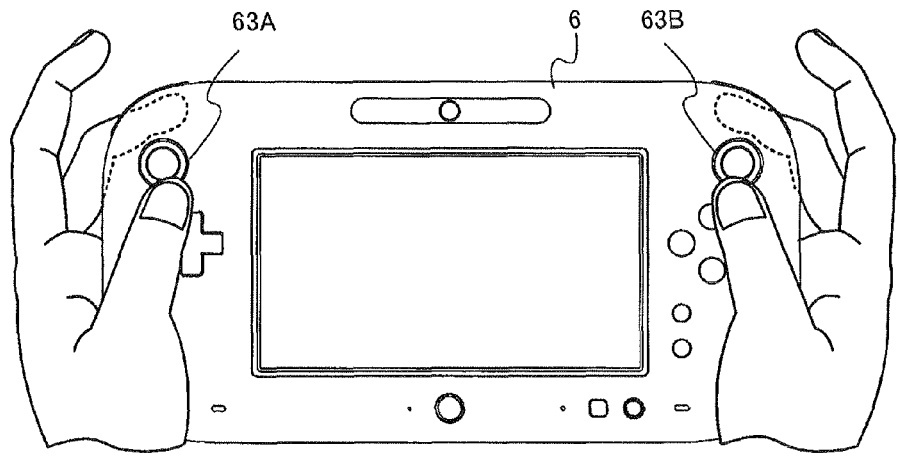
FIG. 4 is a diagram showing a non-limiting example of a state where a user holds the terminal device 6.

Next, a structure of the terminal device 6 will be described with reference to FIGS. 3 to 5. FIG. 3 is a diagram illustrating an example of an external structure of the terminal device 6. More specifically, (a) of FIG. 3 is a front view of the terminal device 6, (b) of FIG. 3 is a top view, (c) of FIG. 3 is a right side view, and (d) of FIG. 3 is a bottom view. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in FIG. 3, the terminal device 6 has, as an operation section, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60. In addition, as shown in FIG. 4, the analog stick 63A is provided so as to be operable with the left hand of a player, and the analog stick 63B is provided so as to be operable with the right hand of a player.

The respective operation buttons 64A to 64L are assigned functions, according to need, in accordance with a game program. For example, the cross button 64A may be used for direction designation operation, selection operation, and the like, and the operation buttons 64E to 64H may be used for determination operation, cancellation operation, and the like.

In addition, the terminal device 6 has, on the surface of the housing 60, an imaging section for taking an image of a marker 8 having two LED modules (hereinafter, referred to as markers) 8L and 8R provided in the vicinity of the display screen of the monitor 2 (on the upper side of the screen shown in FIG. 1). The positions of the markers on the image taken by the imaging section are calculated, and the calculated positions of the markers are transmitted to the game apparatus body 5, whereby the game apparatus body 5 can calculate the motion, the position, the orientation, and the like of the terminal device 6.

Figure 5:
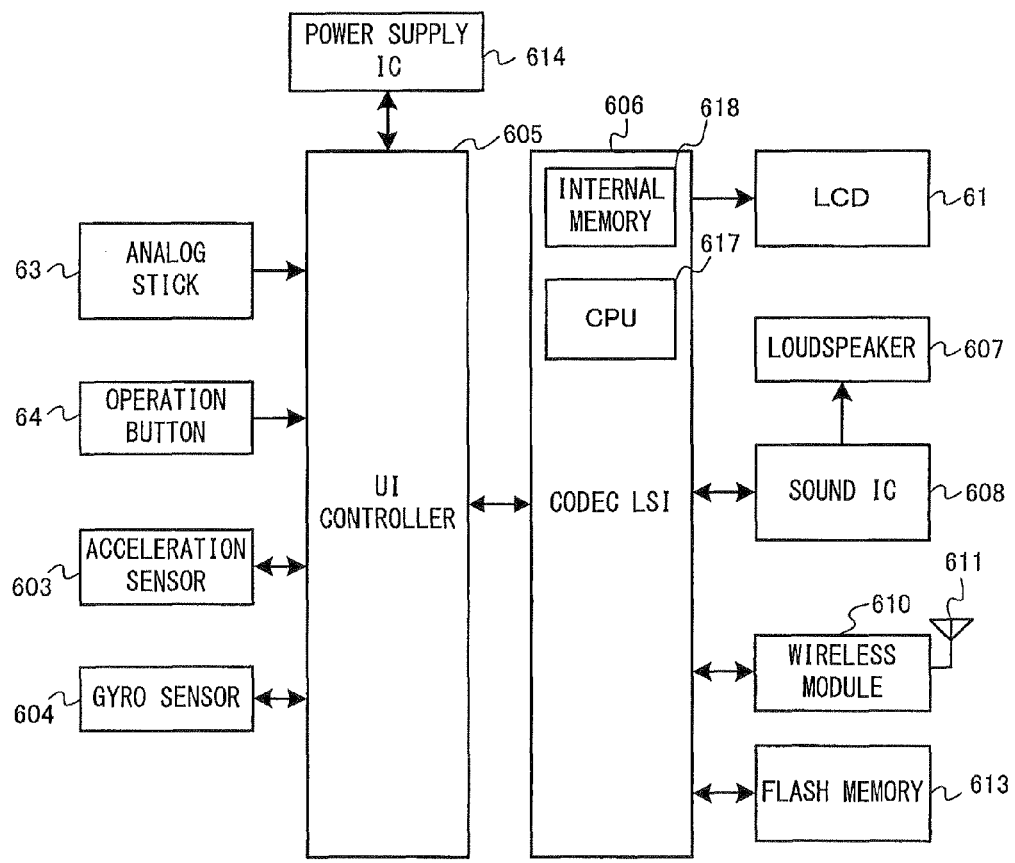
FIG. 5 is a block diagram showing a non-limiting example of an internal structure of the terminal device 6 shown in FIG. 3.

The terminal device 6 has loudspeakers (loudspeakers 607 shown in FIG. 5). Output sound of the loudspeakers 607 is outputted through speaker holes 60a provided in the lower side surface of the housing 60.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, an acceleration sensor 603, the gyro sensor 604, a user interface controller (UI controller) 605, a codec LSI 606, the loudspeakers 607, a sound IC 608, a wireless module 610, an antenna 611, a flash memory 613, and a power supply IC 614. These electronic components are mounted on an electronic circuit board and accommodated in the housing 60.

The UI controller 605 is a circuit for controlling data input to various input/output sections and data output from various input/output sections. The UI controller 605 is connected to the analog stick 63 (the analog sticks 63A and 63B), the operation button 64 (the operation buttons 64A to 64L), the acceleration sensor 603, and the gyro sensor 604. Further, the UI controller 605 is connected to the codec LSI 606. The power supply IC 614 is connected to the UI controller 605, so that power is supplied to the respective components through the UI controller 605.

The analog stick 63 outputs, to the UI controller 605, stick data representing a direction in which the stick part slides (or tilts), and an amount of the sliding (tilting). The operation button 64 outputs, to the UI controller 605, operation button data representing an input state of each of the operation buttons 64A to 64L (whether or not the operation button is pressed).

The acceleration sensor 603 is provided inside the housing 60. The acceleration sensor 603 detects the magnitudes of linear accelerations along three axial directions (xyz axial directions shown in (a) of FIG. 3), respectively. Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the angular velocities around the three axes (the above-described xyz axes), respectively. Angular velocity data representing the detected angular velocities is outputted to the UI controller 605. The UI controller 605 outputs, to the gyro sensor 604, a control instruction for the gyro sensor 604.

The UI controller 605 outputs, to the codec LSI 606, the operation data including the stick data, the operation button data, the orientation data, the acceleration data, and the angular velocity data (hereinafter referred to as terminal operation data), which have been received from the respective components.

The codec LSI 606 is a circuit for performing a compression process on data to be transmitted to the game apparatus body 5, and a decompression process on data transmitted from the game apparatus body 5. The LCD 61, the sound IC 608, the wireless module 610, and the flash memory 613 are connected to the codec LSI 606. The codec LSI 606 includes a CPU 617 and an internal memory 618. Although the terminal device 6 is configured not to perform a game process, for example, the terminal device 6 executes a minimum program for managing the terminal device 6 or a minimum program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The sound IC 608 is a circuit for controlling output of sound data to the loudspeakers 607.

The codec LSI 606 transmits transmission data such as the terminal operation data from the UI controller 605, to the game apparatus body 5 through the wireless module 610. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE 802.11n standard.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is outputted to the LCD 61, and an image according to the image data is displayed on the LCD 61. On the other hand, the decompressed sound data is outputted to the sound IC 608, and a sound based on the sound data is outputted from the loudspeakers 607.

(Game Summary)

Next, with reference to FIGS. 6 to 10, the summary of a game executed by a game system of the exemplary embodiment will be described. Hereinafter, the LCD 61 of the terminal device 6 may be referred to as a display screen of the terminal device 6.

The game of the exemplary embodiment is a rhythm game in which a player character is caused to do a predetermined action in accordance with a predetermined rhythm. The rhythm game of the exemplary embodiment is executed using two images of a monitor game image displayed on the display screen of the monitor 2 and a terminal game image displayed on the display screen of the terminal device 6. That is, a game operation using two screens of the display screen of the monitor 2 and the display screen of the terminal device 6 is performed. First, the monitor game image and the terminal game image will be described.

Figure 6:
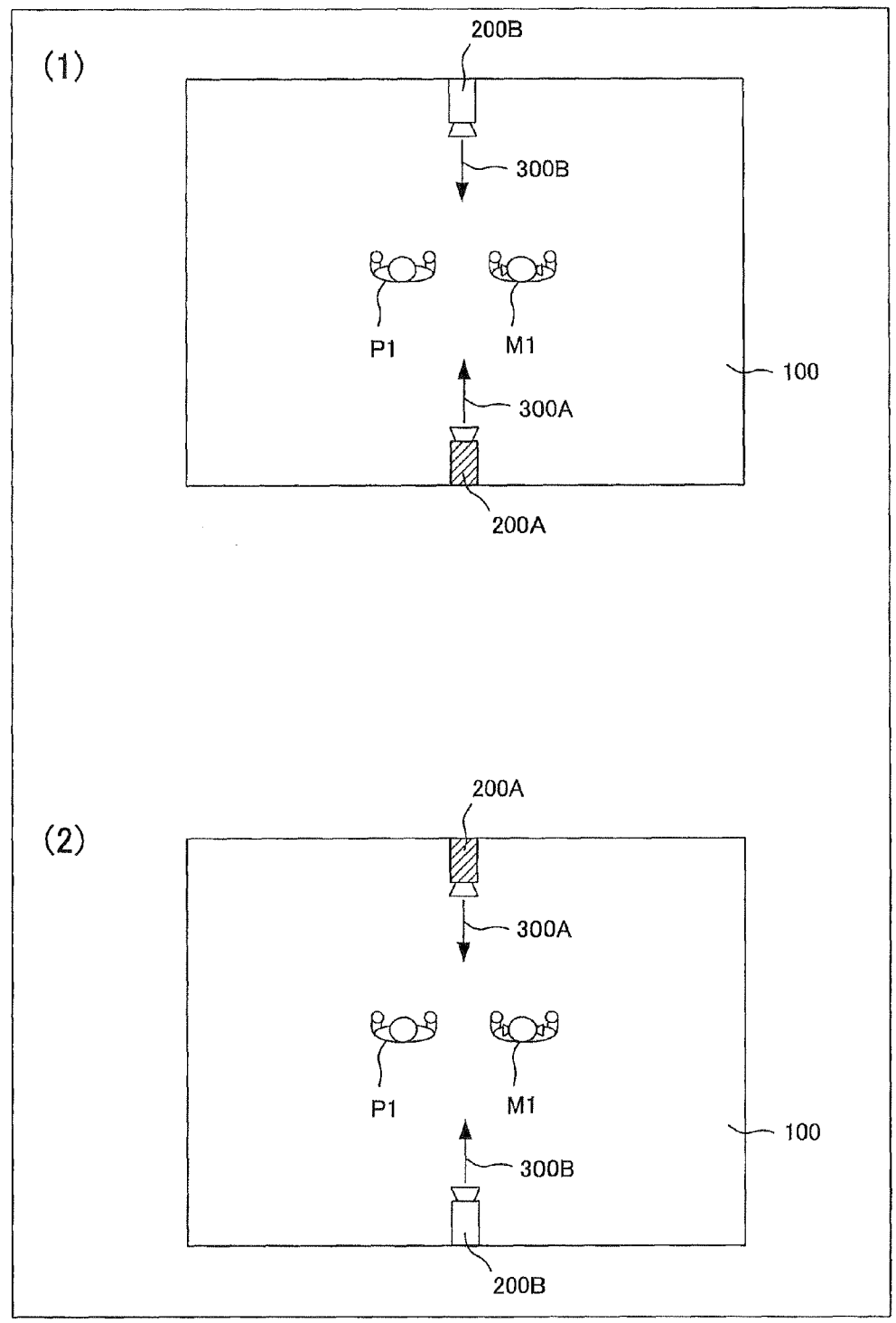
FIG. 6 is a schematic diagram showing a non-limiting example of a virtual space 100 as seen from the above.

As shown in part (1) of FIG. 6, a player object P1 representing a player character and a sample object M1 representing a sample character are placed in a virtual space 100. Images of the virtual space 100 having those objects placed therein are taken by two virtual cameras 200A and 200B placed so as to face each other (so as to have imaging directions opposite to each other). Specifically, as an initial setting, the virtual camera 200A is placed such that an imaging direction 300A thereof is to take an image of the player object P1 from the back thereof, and the virtual camera 200B is placed such that an imaging direction 300B thereof is to take an image of the player object P1 from the front thereof. Then, an image of the virtual space 100 taken by the virtual camera 200A is displayed, as a terminal game image, on the display screen of the terminal device 6, and an image of the virtual space 100 taken by the virtual camera 200B is displayed, as a monitor game image, on the display screen of the monitor 2. Therefore, in the exemplary embodiment, the same virtual space is displayed on each of the display screen of the monitor 2 and the display screen of the terminal device 6 with different viewpoints (a viewpoint from the back and a viewpoint from the front).

Next, the game content of the rhythm game will be described. In the rhythm game of the exemplary embodiment, a rhythm action of the sample object M1 is presented as a question. First, a player views the display screen (monitor game image) of the monitor 2 or the display screen (terminal game image) of the terminal device 6 to memorize a rhythm action (i.e., a question) of the sample object M1 which acts in accordance with the tempo of "one, two, three" as sound to be outputted. Then, in the player's turn of operating the player object P1, the player operates the terminal device 6 to cause the player object P1 to duplicate the rhythm action of the sample object M1 in accordance with the tempo of "one, two, three". Then, if both the timing and the action content of the rhythm action of the player object P1 coincide with those of the rhythm action of the sample object M1, the rhythm action of the player object P1 is determined as "very good"; if one of the timing and the action content is correct, the rhythm action is determined as "good"; and if none of them is correct, the rhythm action is determined as "bad", i.e., an incorrect answer.

The rhythm game is composed of five stages in total, and ten questions (rhythm actions) are presented in each stage. While a player correctly answers each presented question, the player can progress to the next stage. Meanwhile, the life points of the player object P1 decrease by one per one incorrect answer. If the life points decrease to zero, the game is over. It is noted that three points as the above life points are set before start of the game.

The action contents of the rhythm action performed by the sample object M1 (that is, presented as a question) include four actions of "direction pose", "rotation pose", "action pose", and "jump pose".

When a player causes the player object P1 to take a direction pose, the player gives an input in a constant direction (linearly) on the analog stick 63. As a result, an operation target (in the exemplary embodiment, an arm of the player object P1) of the player object P1 moves in a direction corresponding to the input direction. Here, the input direction of the analog stick 63 corresponds to a direction in which the operation target moves as seen from the back of the player object P1. Specifically, if a player gives an input leftward and linearly by tilting leftward the analog stick 63, the player object P1 takes a direction pose by moving its arm leftward as seen from the back. The movement of the right arm of the player object P1 is set to be operable by the analog stick 63B which is operated with the right hand of a player, and the movement of the left arm of the player object P1 is set to be operable by the analog stick 63A which is operated with the left hand of a player. Therefore, when a player performs an operation based on a viewpoint seeing the player object P1 from the back, the player can easily and intuitively recognize the correspondence of direction and it is easy to cause the player object P1 to do an intended rhythm action.

When a player causes the player object P1 to take a rotation pose, the player gives an input (in a curved manner) by rotating the analog stick 63. As a result, an arm of the player object P1 moves so as to rotate in a direction corresponding to the inputted rotation direction. Here, as described above, the rotation direction inputted by the analog stick 63 corresponds to a direction in which an operation target rotates as seen from the back of the player object P1. For example, if a player gives a curved input of tilting the analog stick 63A from the leftward direction to the upward direction, the player object P1 takes a rotation pose of moving its left arm from the left to the above as seen from the back.

When a player causes the player object P1 to take an action pose, the player rotates the terminal device 6. As a result, the player object P1 takes a pose of twisting its body in a direction corresponding to the inputted rotation direction. Here, the rotation direction inputted by the rotation of the terminal device 6 corresponds to a direction in which the player object P1 rotates as seen from the back of the player object P1. For example, if a player rotates the terminal device 6 leftward, the player object P1 takes an action pose of twisting its body leftward as seen from the back.

When a player causes the player object P1 to take a jump pose, the player swings up the terminal device 6. As a result, the player object P1 takes a jump pose of jumping in a direction (upward) corresponding to the inputted swing-up direction.

As described above, when a player causes the player object P1 to perform a rhythm action, operation based on a viewpoint seeing the player object P1 from the back allows the direction correspondence to be intuitively recognized, thus providing easy operation.

Next, each stage of the rhythm game of the exemplary embodiment will be described. It is noted that in each stage, the tempo of "one, two, three" accelerates with progression of questions, and the difficulty level of questions increases with progression of stages.

Figure 7:
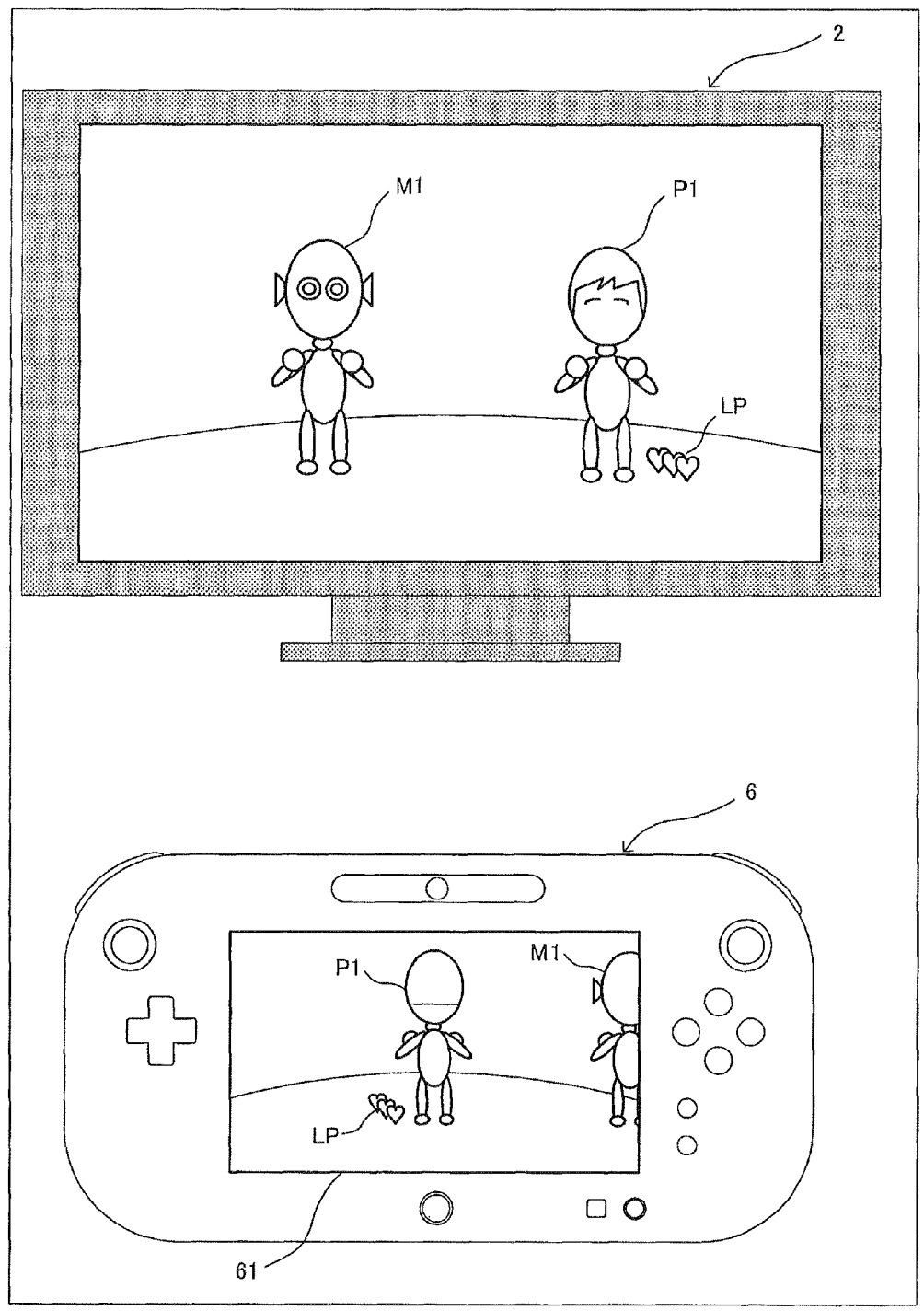
FIG. 7 is a schematic diagram showing a non-limiting example of images displayed on display screens of a monitor 2 and the terminal device 6 in the first stage.

In the first stage, as shown in FIG. 7, an image taken from a viewpoint seeing the front of the player object P1 (hereinafter, referred to as a front viewpoint image) is displayed as a monitor game image on the display screen of the monitor 2, and an image taken from a viewpoint seeing the back of the player object P1 (hereinafter, referred to as a back viewpoint image) is displayed as a terminal game image on the display screen of the terminal device 6. It is noted that a life point image LP which indicates the current life points of the player object P1 is displayed near the feet of the player object P1.

In the first stage, since a back viewpoint image which allows intuitive recognition of direction correspondence is displayed on the terminal device 6, a player can easily operate the player object P1 by playing a game while viewing the display screen of the terminal device 6, rather than viewing the display screen of the monitor 2. Further, the display manner of the terminal device 6 is designed so as to facilitate the player's operation of the player object P1. Specifically, as shown in upper part of FIG. 8, when the sample object M1 performs a rhythm action (that is, when a question is presented), the display focuses the sample object M1, and as shown in lower part of FIG. 8, when a player causes the player object P1 to perform the rhythm action (that is, when a player answers the question), the display focuses the player object P1. By such focusing display, it becomes easy for a player to momentarily memorize the rhythm action because other information hardly comes into the player's field of view. Therefore, in the first stage, if a player plays a game viewing the display screen of the terminal device 6, the player can easily operate the player object P1. On the other hand, the front viewpoint image displayed on the monitor 2 at this time functions as an observation image for other players or observers because the image area is large and the amount of displayed information is large. It is noted that a determination image AC which indicates "very good", "good", or "bad" in order to indicate whether or not an answer of a question is correct is displayed at predetermined positions (for example, at left upper portion) of the monitor game image and the terminal game image.

Figure 9:
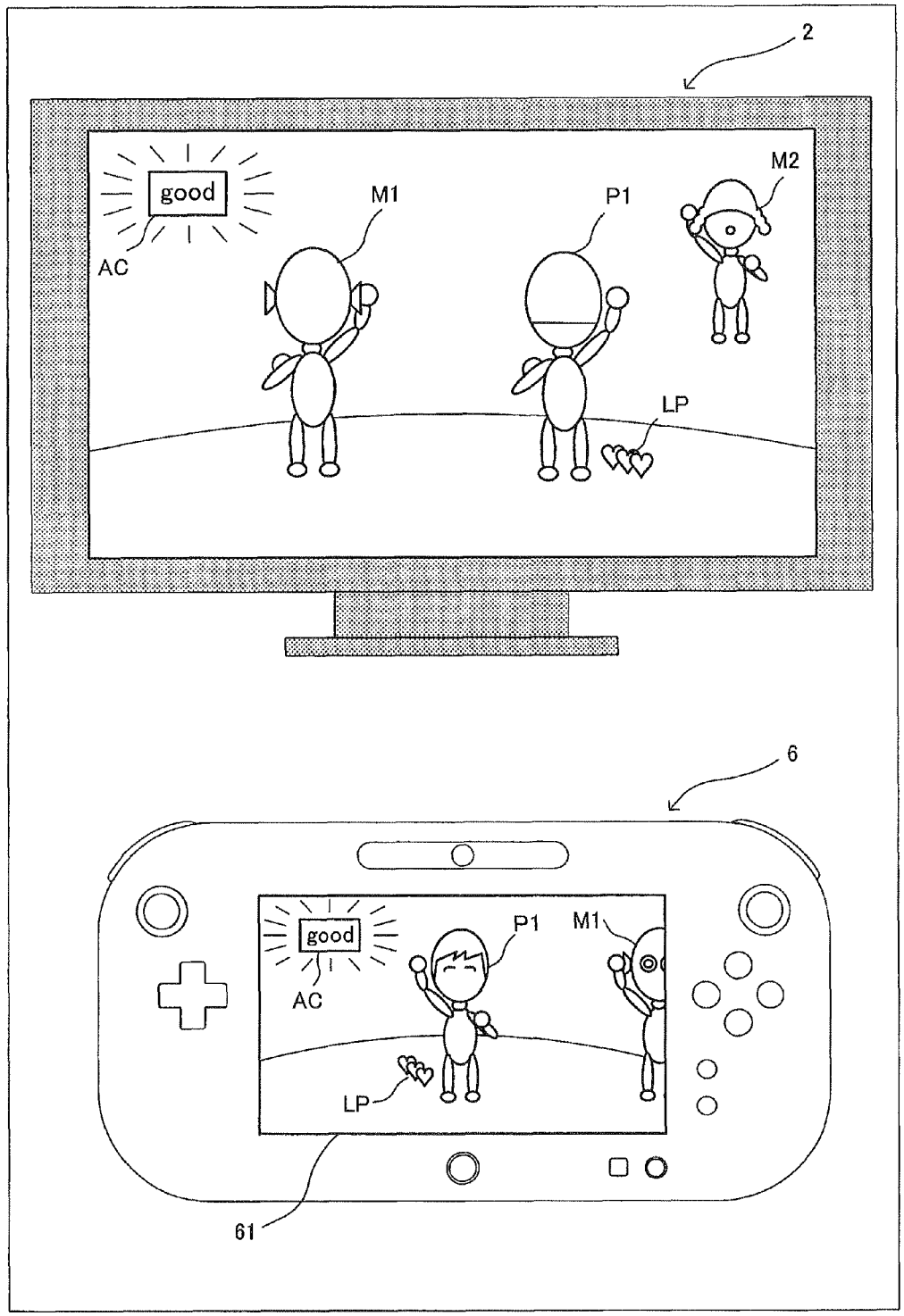
FIG. 9 is a schematic diagram showing a non-limiting example of images displayed on the display screens of the monitor 2 and the terminal device 6 in the second stage.
Figure 10:
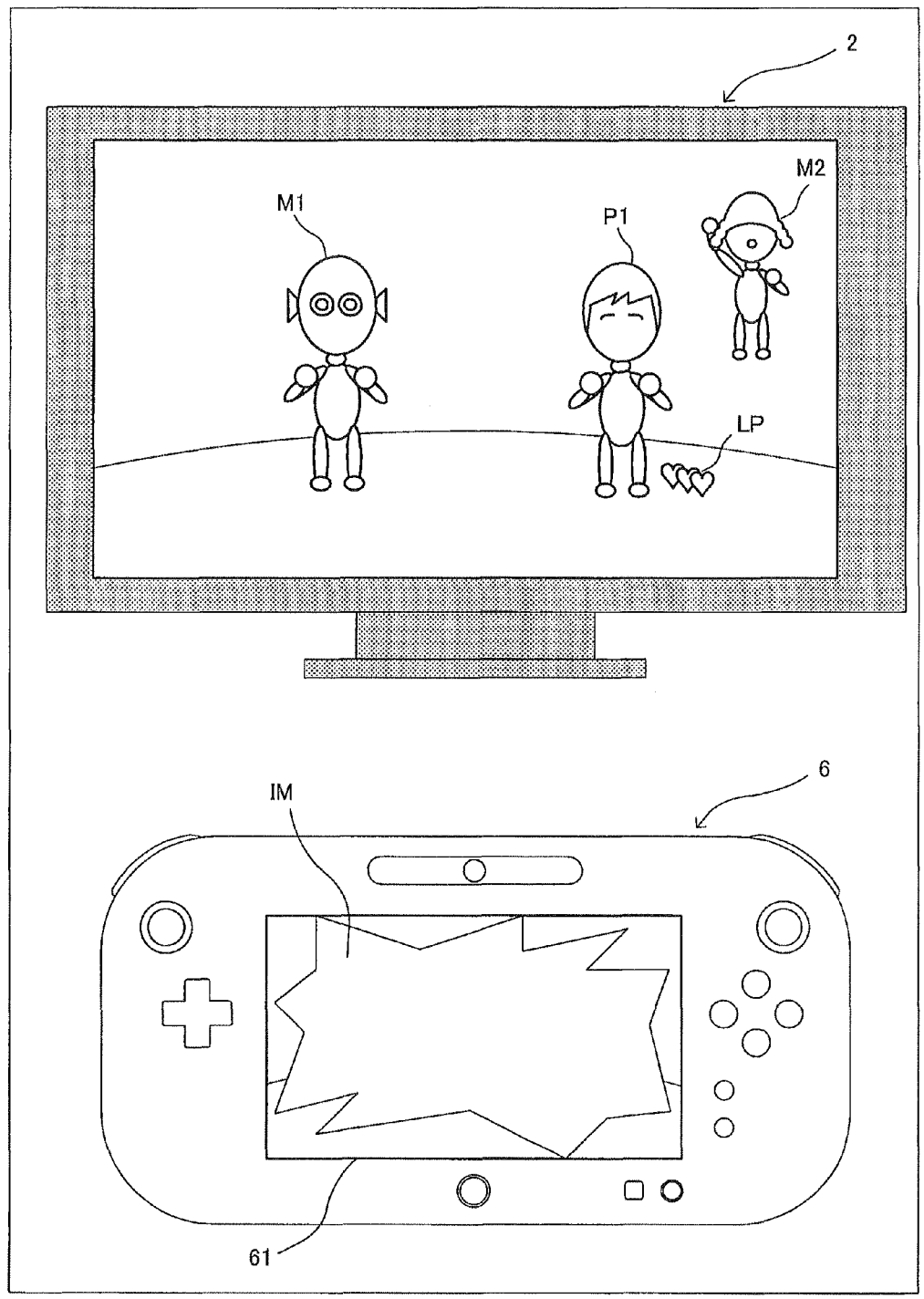
FIG. 10 is a schematic diagram showing a non-limiting example of images displayed on the display screens of the monitor 2 and the terminal device 6 in the third stage.

In the second stage, placements of the virtual camera 200A and the virtual camera 200B are replaced with each other. Specifically, as shown in part (2) of FIG. 6, the virtual camera 200A is placed such that the imaging direction 300A thereof is to take an image of the player object P1 from the front thereof, and the virtual camera 200B is placed such that the imaging direction 300B thereof is to take an image of the player object P1 from the back thereof. Therefore, as shown in FIG. 9, a back viewpoint image is displayed on the display screen of the monitor 2 and a front viewpoint image is displayed on the display screen of the terminal device 6. Therefore, if a player plays a game viewing the monitor 2 displaying a back viewpoint image which allows intuitive recognition of direction correspondence, the player can easily operate the player object P1. However, the monitor 2 does not perform the above-described focusing display unlike the terminal device 6, and the amount of information displayed on the monitor 2 is larger than that of the terminal device 6. Therefore, another object M2 is also displayed, so that other information unnecessary for a player comes into the field of view. Thus, the second stage is higher in difficulty level than the first stage.

In the third stage, placements of the virtual camera 200A and the virtual camera 200B are replaced with each other again, so that a back viewpoint image is displayed on the monitor 2 and a front viewpoint image is displayed on the terminal device 6. Therefore, basically, a player plays a game based on a back viewpoint, to operate the player object P1 while viewing the terminal device 6 displaying a back viewpoint image which allows intuitive recognition of direction correspondence. However, in the third stage, in accordance with the number of times of the player's miss (incorrect answer), the play style is changed for a predetermined number of (zero to two) questions of ten question so as to cause a player to play a game based on a front viewpoint, to operate the player object P1 while viewing the front viewpoint image displayed on the monitor 2.

If the number of times of miss is zero, since the player has a high play skill and the life points are sufficient, a hindering event which changes the play style to cause the player to play based on a front viewpoint occurs for consecutive two questions of ten questions. Specifically, as shown in lower part of FIG. 10, before a predetermined question (for example, the third question) is presented, a hindering event occurs in which a shielding object IM which is an image for hiding at least the sample object M1 is displayed on the display screen of the terminal device 6. As a result, the player cannot perform game operation by viewing the terminal device 6 displaying the back viewpoint image, and is compelled to perform game operation by viewing the monitor 2. Here, in a front viewpoint image, since an input direction by a player does not apparently coincide with the direction of movement of the displayed player object P1, direction correspondence cannot be intuitively recognized. Specifically, when a player operates the analog stick 63A which is operated with the left hand, an arm, of the player object P1, on the right as seen from the front (that is, the left arm) moves, and when a player operates the analog stick 63B which is operated with the right hand, an arm, of the character object P1, on the left as seen from the front (that is, the right arm) moves. If a player tilts the analog stick 63B leftward to give an input leftward and linearly, the player object P1 takes a direction pose of moving its arm rightward as seen from the front. In the middle of questions, since the play style is switched from the back viewpoint play to the front viewpoint play, a player is compelled to abruptly cope with reverse of operation, and therefore, it is difficult to cause the player object P1 to perform a desired action. Thus, the third stage is higher in difficulty level than the first stage and the second stage.

If the number of times of miss is one, since the player has a moderate play skill and there are some life points left, a hindering event occurs for one question of ten questions. Thus, the third stage is slightly higher in difficulty level than the first stage and the second stage.

If the number of times of miss is two, since the player has a low play skill and the life points are not sufficient, a hindering event does not occur. Therefore, in the third stage, the player can play a game based on a back viewpoint while viewing a back viewpoint image displayed on the display screen of the terminal device 6, as in the first stage.

As described above, in the third stage, a hindering event occurs zero to two times in accordance with the number of times of miss, thereby enabling setting of difficulty level in accordance with the skill level of a player. Thus, even players having different skill levels can enjoy the same game together. In addition, for a player having a moderate or higher play skill, since the game style is changed in the middle of the game in the third stage, it is possible to enjoy game operation full of variety while alternately viewing the two display screens of the monitor 2 and the terminal device 6 in the middle of the game.

It is noted that even if the number of times of miss is zero before start of the third stage, there is a possibility that the number of times of miss becomes two because a player might miss by the time just before occurrence of the hindering event. In such a case, it is not appropriate to cause a hindering event which compels the player to do front viewpoint play with a high difficulty level, in spite of insufficiency of life points. Therefore, whether or not to cause a hindering event is determined again based on the number of times of miss just before occurrence of the hindering event.

In the fourth stage and the fifth stage, as in the third stage, the number of times of occurrence of a hindering event is determined based on the cumulative number of times of miss before start of the stage, and whether or not to actually cause the hindering event is determined based on the cumulative number of times of miss just before occurrence of the hindering event.

(Game Processing)

Next, with reference to FIGS. 11 to 14, the operation of the game system 1 for realizing the above game will be described in detail.

Figure 11:
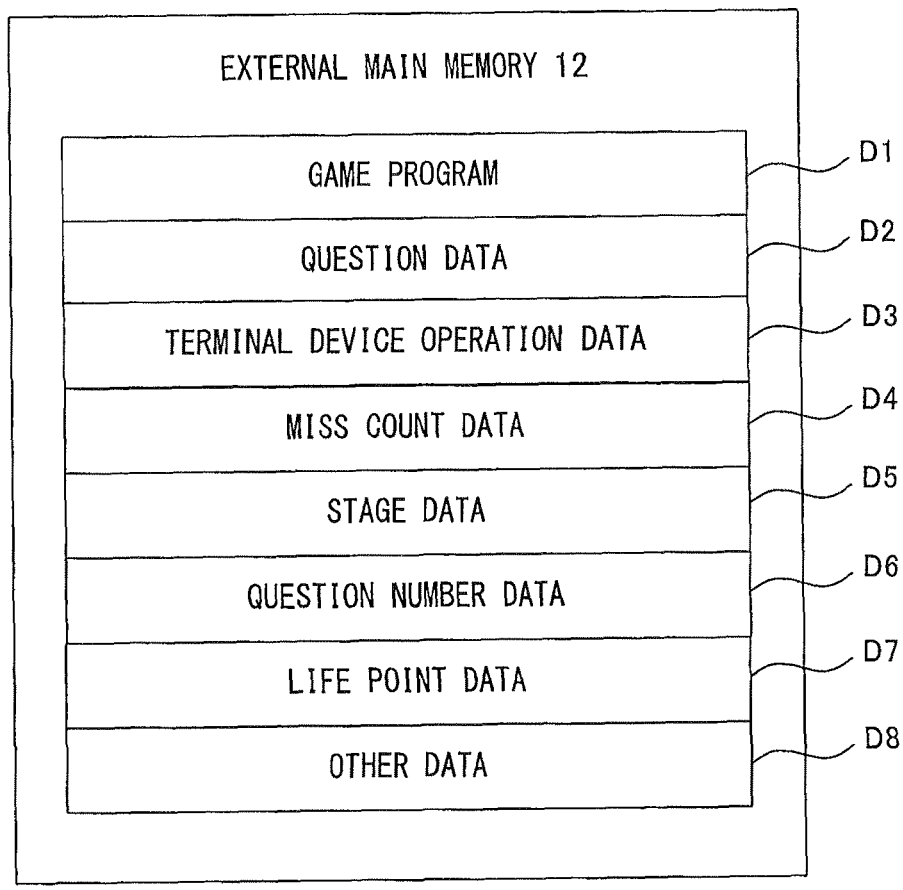
FIG. 11 is a diagram showing a non-limiting example of the memory map of an external main memory 12.

FIG. 11 shows an example of various kinds of data stored in the external main memory 12 of the game apparatus body 5 when the above game is executed.

A game program D1 is a program for causing the CPU 10 of the game apparatus body 5 to execute game processing for realizing the above game. The game program D1 is, for example, loaded from the optical disc 4 into the external main memory 12.

Question data D2 is data of rhythm action presented in the rhythm game. The data of rhythm action includes a timing ("one", "two", or "three"), and a pose action corresponding to the timing.

Terminal operation data D3 is operation data periodically transmitted from the terminal device 6. As previously described, the terminal operation data D3 includes stick data, velocity data, acceleration data, and the like.

Miss count data D4 is data indicating the number of times a player has missed in a game (miss count value), and is updated by being incremented by one every time a player misses.

Stage data D5 is numeral data indicating the stage number of the current game, and is incremented every time a player proceeds to the next stage.

Question number data D6 is numeral data indicating the current question number in a stage, and is incremented every time one question is presented.

Life point data D7 is numeral data indicating a life point value of the player object P1. The data is set at 3 as an initial value and is updated by being decremented by one every time a player misses.

Other data D8 includes various pieces of data for game processing, such as data of the current placement of a virtual camera and image data of a player character and the like.

Next, with reference to flowcharts shown in FIGS. 12 to 14, the flow of game processing executed by the CPU 10 of the game apparatus body 5 based on the game program D1 will be described. It is noted that the game processing in the case where a series of rhythm games from the first stage to the fifth stage (final stage) are executed will be described below, and the description of the other processing is omitted.

Figure 12:
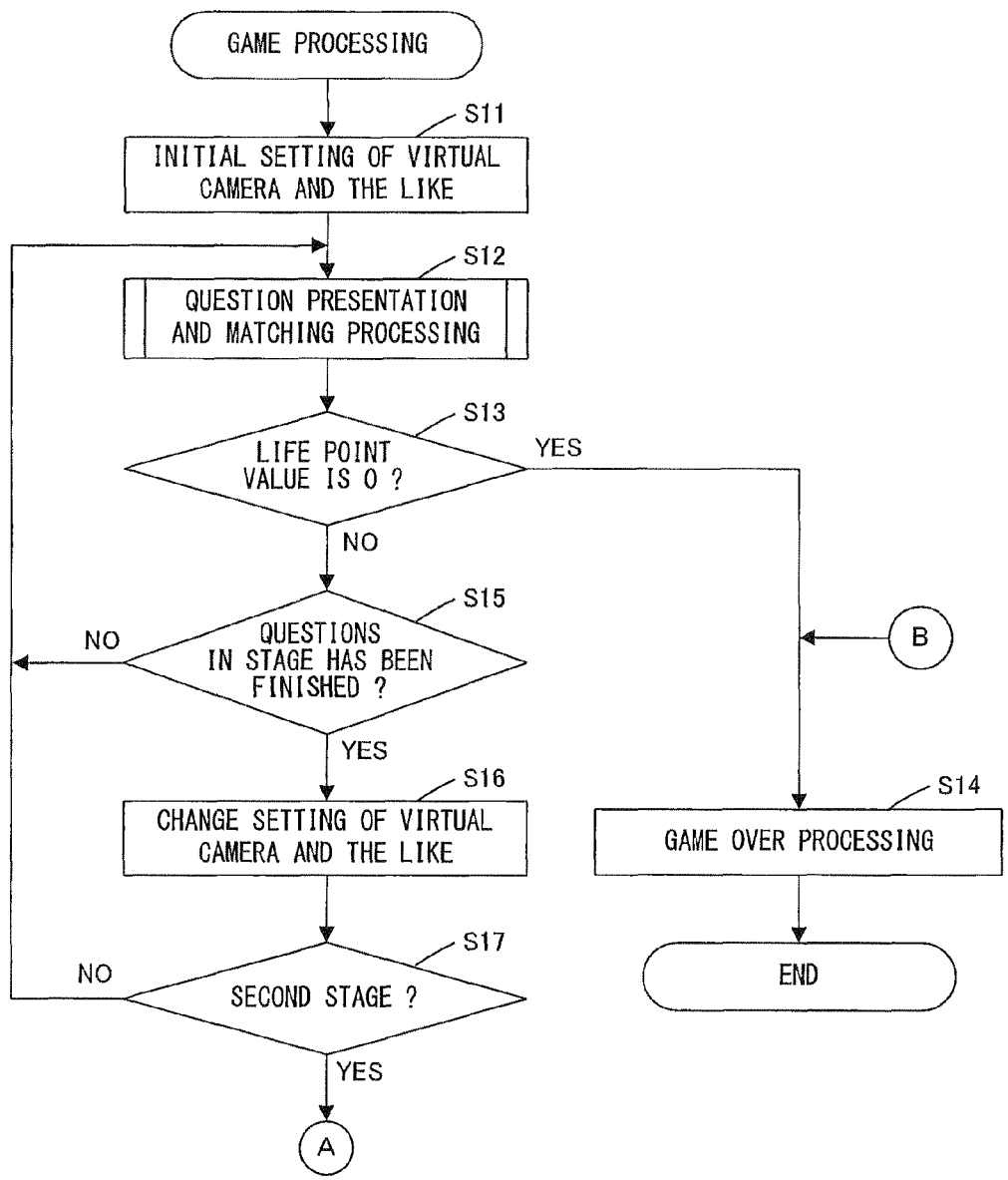
FIG. 12 shows a non-limiting example of a game processing flowchart based on a game program D1.

When execution of the game program D1 is started, first, in step S11 in FIG. 12, the CPU 10 performs initial setting for the virtual cameras 200A and 200B and the like. Specifically, the CPU 10 places the virtual camera 200A and the virtual camera 200B in the virtual space 100 as shown in part (1) of FIG. 6. In addition, the CPU 10 clears the miss count data D4 in the external main memory 12 (sets the miss count value at "0"), sets the stage data D5 at a value "1" indicating the first stage, and sets the question number data D6 at a value "1" indicating the first question. Then, the process proceeds to step S12.

Figure 14:
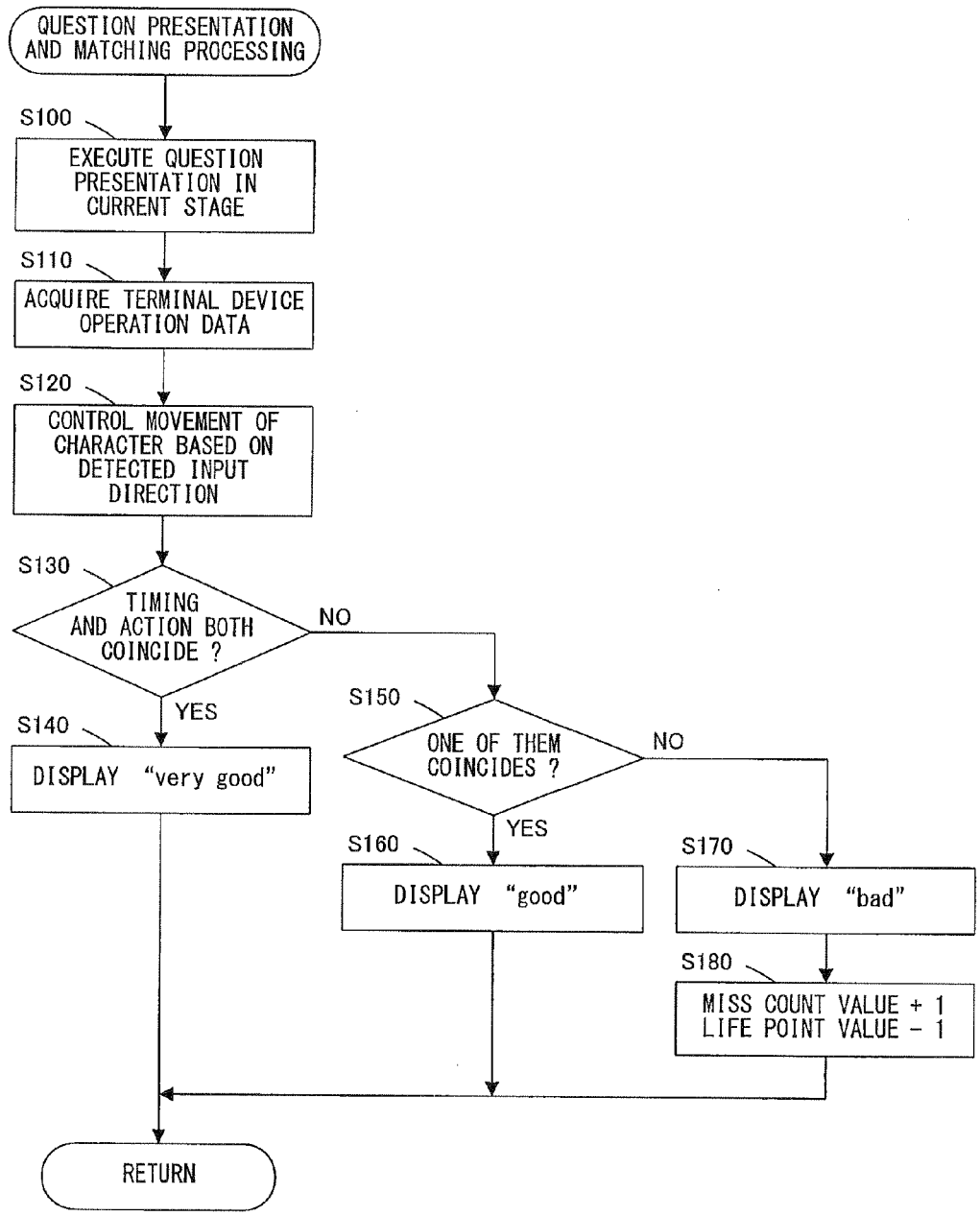
FIG. 14 shows a non-limiting example of a game processing flowchart based on the game program D1.

In step S12, the CPU 10 performs question presentation and matching processing shown in FIG. 14.

In step S100 in FIG. 14, the CPU 10 executes question presentation of the current stage. Specifically, the CPU 10 reads a predetermined rhythm action from the question data D2 stored in the external main memory 12, and controls the sample object M1 based on the rhythm action. Then, the CPU 10 generates a terminal game image taken by the virtual camera 200A and a monitor game image taken by the virtual camera 200B. The generated monitor game image is outputted from the game apparatus body 5 to the monitor 2, to be displayed on the display screen of the monitor 2. The generated terminal game image is outputted from the game apparatus body 5 to the terminal device 6, to be displayed on the display screen of the terminal device 6. It is noted that a part or the entirety of the generation processing of the monitor game image and the terminal game image may be performed by the GPU 32 in accordance with an instruction from the CPU 10. Then, the process proceeds to step S110.

In step S110, the CPU 10 acquires the terminal apparatus operation data D3 from the terminal device 6. Then, the process proceeds to step S120.

In step S120, the CPU 10 detects an input direction based on the terminal apparatus operation data D3, and controls the character object P1 based on the detected input direction. Specifically, the CPU 10 detects a linear or curved input direction on the analog stick 63, based on the stick data of the terminal apparatus operation data D3. In addition, the CPU 10 detects a rotation direction of the terminal device 6, based on the angular velocity data of the terminal apparatus operation data D3. In addition, the CPU 10 detects the swing-up direction of the terminal device 6, based on the acceleration data of the terminal apparatus operation data D3. It is noted that when the terminal device 6 is swung up, variation in the angular velocity data can also be detected. Therefore, the CPU 10 may determine that the terminal device 6 is rotating, on the condition that the angular velocity exceeds a predetermined threshold value. Then, the CPU 10 controls the player object P1, based on the detected input direction. Specifically, the CPU 10 causes the player object P1 to take a direction pose based on a linear input direction of the analog stick 63, causes the player object P1 to take a rotation pose based on a curved input direction of the analog stick 63, causes the player object P1 to take an action pose based on a rotation direction of the terminal device 6, and causes the player object P1 to take a jump pose based on a swing-up direction of the terminal device 6.

Then, the CPU 10 generates a terminal game image taken by the virtual camera 200A and a monitor game image taken by the virtual camera 200B. The generated monitor game image is outputted from the game apparatus body 5 to the monitor 2, to be displayed on the display screen of the monitor 2. The generated terminal game image is outputted from the game apparatus body 5 to the terminal device 6, to be displayed on the display screen of the terminal device 6. In addition, the CPU 10 updates the question number data D6 by incrementing its value. Then, the process proceeds to step S130.

In step S130, regarding the action (rhythm action) of the player object P1 controlled based on an input (input direction) by a player, the CPU 10 determines whether or not both the timing and the content of the action coincide with those of the rhythm action of the sample object M1. If the determination result is YES, the process proceeds to step S140, and if the determination result is NO, the process proceeds to step S150.

In step S140, the CPU 10 displays an image indicating "very good" as the determination image AC. Specifically, the CPU 10 displays the determination image indicating "very good" at predetermined positions on the monitor game image and the terminal game image. Then, the question presentation and the matching processing are finished to return to the subsequent process.

In step S150, regarding the action (rhythm action) of the player object P1 controlled based on an input (input direction) by a player, the CPU 10 determines whether or not one of the timing and the content of the action coincides with that of the rhythm action of the sample object M1. If the determination result is YES, the process proceeds to step S160, and if the determination result is NO (that is, none of the timing and the operation coincides with the rhythm action), the process proceeds to step S170.

In step S160, the CPU 10 displays an image indicating "good" as the determination image AC. Specifically, the CPU 10 displays the determination image indicating "good" at predetermined positions on the monitor game image and the terminal game image. Then, the question presentation and the matching processing are finished to return to the subsequent process.

In step S170, the CPU 10 displays an image indicating "bad" as the determination image AC. Specifically, the CPU 10 displays the determination image indicating "bad" at predetermined positions (for example, left upper portion) on the monitor game image and the terminal game image. Then, the process proceeds to step S180.

In step S180, the CPU 10 updates the miss count data D4 by incrementing the miss count value by one. In addition, the CPU 10 updates the life point data D7 by decrementing the life point value by one, changes the life point image LP which indicates the life points, and displays the life point image LP at predetermined positions (for example, near the feet of the player object P1) on the monitor game image and the terminal game image. Then, the question presentation and the matching processing are finished to return to the subsequent process.

In FIG. 12, in step S13, the CPU 10 determines whether or not the current life point value is zero, by referring to the life point data D7. If the determination result is YES, the process proceeds to step S14, and if the determination result is NO, the process proceeds to step S15.

In step S14, the CPU 10 performs game over processing, to finish the game processing. Specifically, the CPU 10 displays a game over image indicating that the game is over, at predetermined positions on the monitor game image and the terminal game image, to finish the game processing.

In step S15, the CPU 10 determines whether or not the questions in the current stage have been finished. Specifically, the CPU 10 determines whether or not the final question (the tenth question) in the current stage has been presented (that is, determines whether or not the question number data D6 has become "11" by being incremented after the tenth question has been presented). If the determination result is YES, the process proceeds to step S16 in order to progress to the next stage, and if the determination result is NO, the process proceeds to step S12 in order to progress to the next question in the current stage.

In step S16, the CPU 10 changes the setting of the virtual cameras 200A and 200B and the like. Specifically, the CPU 10 changes the placements of the virtual camera 200A and the virtual camera 200B as shown in part (2) of FIG. 6 (that is, replaces the placements of the virtual camera 200A and the virtual camera 200B with each other). In addition, the CPU 10 updates the stage data D5 by incrementing its value, and sets the question number data D6 at a value "1" indicating the first question. Then, the process proceeds to step S17.

In step S17, the CPU 10 determines whether or not the current stage is the second stage. Specifically, the CPU 10 determines whether or not the stage data D5 is "2". If the determination result is YES, the process proceeds to step S18 in FIG. 13 in order to progress to the third stage, and if the determination result is NO (that is, the current stage is the first stage), the process proceeds to step S12.

Figure 13:
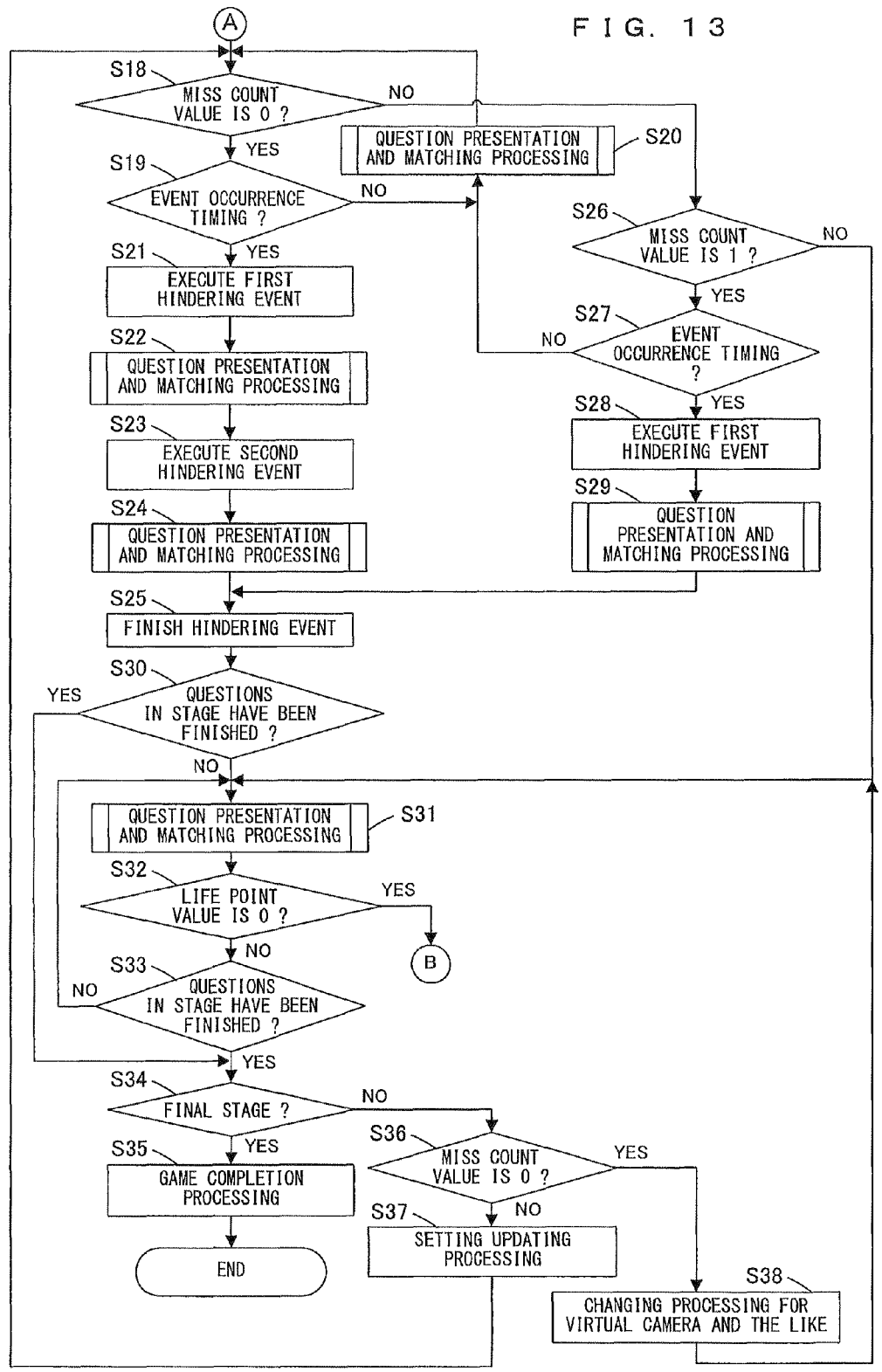
FIG. 13 shows a non-limiting example of a game processing flowchart based on the game program D1.

In FIG. 13, in step S18, the CPU 10 determines whether or not the current miss count value is zero, by referring to the miss count data D4. If the determination result is YES, the process proceeds to step S19, and if the determination result is NO, the process proceeds to step S26.

In step S19, the CPU 10 determines whether or not it is time to cause a hindering event. Specifically, by referring to the question number data D6, the CPU 10 determines whether or not the value coincides with a set question number (for example, the third question). It is noted that the question number to cause a hindering event may be stored in advance in the external main memory 12 or may be randomly determined. If the determination result is YES, the process proceeds to step S21, and if the determination result is NO, the process proceeds to step S20.

In step S20, the CPU 10 performs question presentation and matching processing. It is noted that the processing of step S20 is the same as in the question presentation and matching processing described in step S12, and the detailed description thereof is omitted. Then, the process proceeds to step S18.

In step S21, the CPU 10 executes the first hindering event. Specifically, the CPU 10 displays the shielding object IM at a predetermined position (at least at a position hiding the sample object M1) on the terminal game image. Then, the process proceeds to step S22.

In step S22, the CPU 10 performs question presentation and matching processing. It is noted that the processing of step S22 is the same as in the question presentation and matching processing described in step S12, and the detailed description thereof is omitted. Then, the process proceeds to step S23.

In step S23, the CPU 10 executes the second hindering event. Specifically, the CPU 10 successively displays the shielding image IM displayed at the predetermined position on the terminal game image. Then, the process proceeds to step S24.

In step S24, the CPU 10 performs question presentation and matching processing. It is noted that the processing of step S24 is the same as in the question presentation and matching processing described in step S12, and the detailed description thereof is omitted. Then, the process proceeds to step S25.

In step S25, the CPU 10 finishes the hindering event. Specifically, the CPU 10 eliminates the display of the shielding image IM displayed at the predetermined position on the terminal game image. Then, the process proceeds to step S30.

It is noted that by execution of the above process from step S21 to step S25, a hindering event occurs in consecutive two questions from a question number (for example, the third question) set in advance, of the ten questions.

In step S26, the CPU 10 determines whether or not the current miss count value is one, by referring to the miss count data D4. If the determination result is YES, the process proceeds to step S27, and if the determination result is NO (that is, the miss count value is two), the process proceeds to step S31.

In step S27, the CPU 10 determines whether or not it is time to cause a hindering event. Specifically, by referring to the question number data D6, the CPU 10 determines whether or not the value coincides with a set question number (for example, the fifth question). If the determination result is YES, the process proceeds to step S28, and if the determination result is NO, the process proceeds to step S20.

In step S28, the CPU 10 executes the first hindering event. It is noted that the processing of step S28 is the same as the processing of step S21, and the detailed description thereof is omitted. Then, the process proceeds to step S29.

In step S29, the CPU 10 performs question presentation and matching processing. It is noted that the processing of step S29 is the same as in the question presentation and matching processing described in step S12, and the detailed description thereof is omitted. Then, the process proceeds to step S25.

It is noted that by execution of the above process of step S28, step S29, and step S25, a hindering event occurs in a question number (for example, the fifth question) set in advance, of the ten questions.

In step S30, the CPU 10 determines whether or not the questions in the current stage have been finished. It is noted that the processing of step S30 is the same as the processing of step S15, and the detailed description thereof is omitted. If the determination result is YES, the process proceeds to step S34, and if the determination result is NO, the process proceeds to step S31.

In step S31, the CPU 10 performs question presentation and matching processing. It is noted that the processing of step S31 is the same as in the question presentation and matching processing described in step S12, and the detailed description thereof is omitted. Then, the process proceeds to step S32.

In step S32, the CPU 10 determines whether or not the current life point value is zero, by referring to the life point data D7. If the determination result is YES, the process proceeds to step S14 (see FIG. 12), and if the determination result is NO, the process proceeds to step S33.

In step S33, the CPU 10 determines whether or not the questions in the current stage have been finished. It is noted that the processing of step S33 is the same as the processing of step S15, and the detailed description thereof is omitted. If the determination result is YES, the process proceeds to step S34, and if the determination result is NO, the process proceeds to step S31.

In step S34, the CPU 10 determines whether or not the current stage is the final stage (the fifth stage). Specifically, the CPU 10 determines whether or not the stage data D5 is "5". If the determination result is YES, the process proceeds to step S35, and if the determination result is NO, the process proceeds to step S36.

In step S35, the CPU 10 performs game completion processing, to finish the game processing. Specifically, the CPU 10 displays a game completion image indicating that the game has been completed, at predetermined positions on the monitor game image and the terminal game image, to finish the game processing.

In step S36, the CPU 10 determines whether or not the current miss count value is two, by referring to the miss count data D4. If the determination result is YES, the process proceeds to step S38, and if the determination result is NO, the process proceeds to step S37.

In step S37, the CPU 10 performs setting updating processing. Specifically, the CPU 10 updates the stage data D5 by incrementing its value, and sets the question number data D6 at a value "1" indicating the first question. Then, the process proceeds to step S18.

In step S38, the CPU 10 changes the setting of the virtual cameras 200A and 200B and the like. Specifically, the CPU 10 replaces the current placements of the virtual camera 200A and the virtual camera 200B with each other. In addition, the CPU 10 updates the stage data D5 by incrementing its value, and sets the question number data D6 at a value "1" indicating the first question. Then, the process proceeds to step S31.

As described above, according to the exemplary embodiment, first, the viewpoint of an image displayed on the monitor 2 and the viewpoint of an image displayed on the terminal device 6 (that is, a viewpoint from the back and a viewpoint from the front) are replaced with each other between stages (for example, between the first stage and the second stage), whereby the display screen displaying a back viewpoint image which facilitates the player's game operation is switched between the monitor 2 and the terminal device 6. As a result, a player changes the play style by changing the display screen to view for performing game operation between stages. In addition, for a player having a moderate or higher skill, a hindering event occurs in the middle of the game (for example, at a predetermined question in the third stage), whereby the play style for the game is forcibly changed. Thus, game operation full of variety can be realized. In addition, the number of times of occurrence of a hindering event is controlled in accordance with the number of times (miss count value) a player has missed until the current stage, whereby the difficulty level can be set in accordance with the skill level of a player, and even players having different skill levels can enjoy the same game.

It is noted that the above exemplary embodiment is merely an example, and the exemplary embodiments are not limited thereto at all.

In the above exemplary embodiment, if the miss count value is zero, a hindering event occurs in consecutive two questions, for example. However, a hindering event may occur in two questions that are not consecutive. In addition, the number of questions where a hindering event occurs is not limited to two.

In the above exemplary embodiment, the placements of the virtual camera 200A and the virtual camera 200B are replaced with each other, whereby a back viewpoint image and a front viewpoint image are switched. However, instead of replacing the placements of the virtual camera 200A and the virtual camera 200B, the orientations of the player object P1 and the sample object M1 may be changed by 180 degrees. Alternatively, instead of replacing the placements of the virtual camera 200A and the virtual camera 200B, the output destinations of an image taken by the virtual camera 200A (back viewpoint image) and an image taken by the virtual camera 200B (front viewpoint image) may be switched between the monitor 2 and the terminal device 6.

In the above exemplary embodiment, the plurality of processes shown in FIGS. 12 to 14 are executed by one computer (the CPU 10). However, in another exemplary embodiment, these processes may be shared by a plurality of computers. In still another exemplary embodiment, some of these processes may be realized by means of a hardware circuit.

In the above exemplary embodiment, the plurality of processes shown in FIGS. 12 to 14 are executed by one information processing apparatus (the game apparatus body 5). However, in another exemplary embodiment, these processes may be shared by a plurality of information processing apparatuses (for example, the game apparatus body 5 and a server apparatus).

In the above exemplary embodiment, the game program D1 is provided from the optical disc 4 to the game apparatus body 5. However, in another exemplary embodiment, the game program D1 may be provided from any computer-readable storage medium (for example, CD-ROM, semiconductor memory, or the like) to the game apparatus body 5. In still another exemplary embodiment, the game program D1 may be stored in advance in a nonvolatile memory (the ROM/RTC 13 or the flash memory 17) in the game apparatus body 5. In still another exemplary embodiment, the game program D1 may be transmitted from another information processing apparatus (game apparatus or server apparatus) to the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is in all aspects illustrative and not restrictive. It is understood that numerous other modifications and variations can be devised.

What is claimed is:

1. A game system comprising:
   an operation device having an operation section and a first display section;
   an input direction detector configured to detect an input direction that is designated, based on input to the operation section;
   an object controller configured to, in accordance with the input direction, perform control such that an operation target object in a virtual space moves in a predetermined direction in the virtual space associated with the input direction;
   a first virtual camera setter configured to set a first virtual camera for taking the operation target object in a first direction;
   a second virtual camera setter configured to set a second virtual camera for taking the operation target object in a second direction which is substantially opposite to the first direction;
   a first image generator configured to generate a first game screen, based on the first virtual camera;
   a second image generator configured to generate a second game screen, based on the second virtual camera;
   a first image transmitter configured to transmit the first game screen to the operation device;
   a second image outputter configured to output the second game screen to a second display device which is a device separate from the first display section; and
   a viewpoint switcher configured to, at a predetermined timing based on game processing, in the virtual space, replace a direction in which the first virtual camera is set as seen from the operation target object and a direction in which the second virtual camera is set as seen from the operation target object with each other;
   the first image generator further generates an image shielding at least a part of an image of the virtual space taken by the first virtual camera, at a predetermined timing based on a game processing.

2. The game system according to claim 1, wherein
   the viewpoint switcher replaces, in accordance with game progress, a direction in which the first virtual camera is set as seen from the operation target object and a direction in which the second virtual camera is set as seen from the operation target object with each other.

3. The game system according to claim 1, wherein
   the operation target object is at least a part of a player object,
   the first virtual camera setter sets the first virtual camera such that the first virtual camera takes the operation target object from a viewpoint seeing the back of the player object,
   the second virtual camera setter sets the second virtual camera such that the second virtual camera takes the operation target object from a viewpoint seeing the front of the player object,
   the object controller performs control such that the input direction is the same as a movement direction of the at least part of the player object as seen from the back, and
   the viewpoint switcher replaces the viewpoint seeing the back and the viewpoint seeing the front with each other, or reverses a direction of the player object.

4. The game system according to claim 3, wherein
   the operation section includes a stick section,
   the input direction detector detects a stick input direction, based on an input to the stick section, and
   the object controller performs control such that the stick input direction apparently coincides with a movement direction of the at least part of the player object as seen from the back.

5. The game system according to claim 4, wherein
   the stick section includes a left stick section provided so as to be operable by the left hand of a player, and a right stick section provided so as to be operable by the right hand of a player,
   the operation target object includes a left object which is a part of the player object and is positioned on the left as seen from the back, and a right object which is a part of the player object and is positioned on the right as seen from the back,
   the input direction detector
      detects a left stick input direction, based on an input to the left stick section, and
      detects a right stick input direction, based on an input to the right stick section, and
   the object contoller
      performs control such that the left stick input direction apparently coincides with a movement direction of the left object as seen from the back, and
      performs control such that the right stick input direction apparently coincides with a movement direction of the right object as seen from the back.

6. The game system according to claim 1, further comprising
   a game progress controller configured to progress a game when movement of the operation target object controlled by the object controller is the same as predetermined movement that is set.

7. The game system according to claim 6, further comprising:
   a timing determiner configured to determine whether or not a timing of an input to the operation section coincides with a predetermined timing that is set; and
   a movement direction determiner configured to determine whether or not the input direction detected by the input direction detector is the same as a predetermined direction that is set, wherein
   the game progress controller progresses a game when at least one of a determination result by the timing determiner and a determination result by the movement direction determiner is positive.

8. The game system according to claim 1, wherein
   the operation section includes a gyro sensor, and
   the input direction detector detects the input direction that is designated, based on the gyro sensor.

9. A game processing method comprising:
   detecting an input direction that is designated, based on input to an operation section of an operation device;
   performing control, in accordance with the input direction, such that an operation target object in a virtual space moves in a predetermined direction in the virtual space associated with the input direction;

setting a first virtual camera for taking the operation target object in a first direction;
setting a second virtual camera for taking the operation target object in a second direction which is substantially opposite to the first direction;
generating a first game screen, based on the first virtual camera;
generating a second game screen, based on the second virtual camera;
transmitting the first game screen to the operation device;
outputting the second game screen to a second display device which is a device separate from a first display section of the operation device;
replacing, at a predetermined timing based on game processing, in the virtual space, a direction in which the first virtual camera is set as seen from the operation target object and a direction in which the second virtual camera is set as seen from the operation target object with each other; and
generating an in at least a part of an image of the virtual space taken by the first virtual camera, at a predetermined timing based on game processing.

10. The game processing method according to claim 9, wherein
the replacing step replaces, in accordance with game progress, a direction in which the first virtual camera is set as seen from the operation target object and a direction in which the second virtual camera is set as seen from the operation target object with each other.

11. The game processing method according to claim 9, wherein
the operation target object is at least a part of a player object,
the first virtual camera setting step sets the first virtual camera such that the first virtual camera takes the operation target object from a viewpoint seeing the back of the player object,
the second virtual camera setting step sets the second virtual camera such that the second virtual camera takes the operation target object from a viewpoint seeing the front of the player object,
the object control step performs control such that the input direction is the same as a movement direction of the at least part of the player object as seen from the back, and
the replacing step replaces the viewpoint seeing the back and the viewpoint seeing the front with each other, or reverses a direction of the player object.

12. The game processing method according to claim 11, wherein
the operation section includes a stick section,
the input direction detection step detects a stick input direction, based on an input to the stick section, and
the object control step performs control such that the stick input direction apparently coincides with a movement direction of the at least part of the player object as seen from the back.

13. The game processing method according to claim 12, wherein
the stick section includes a left stick section provided so as to be operable by the left hand of a player, and a right stick section provided so as to be operable by the right hand of a player,
the operation target object includes a left object which is a part of the player object and is positioned on the left as seen from the back, and a right object which is a part of the player object and is positioned on the right as seen from the back,
the input direction detection step
detects a left stick input direction, based on an input to the left stick section, and
detects a right stick input direction, based on an input to the right stick section, and
the object control step
performs control such that the left stick input direction apparently coincides with a movement direction of the left object as seen from the back, and
performs control such that the right stick input direction apparently coincides with a movement direction of the right object as seen from the back.

14. The game processing method according to claim 9, further comprising
progressing a game when movement of the operation target object controlled in the object control step is the same as predetermined movement that is set.

15. The game processing method according to claim 14, further comprising:
determining whether or not a timing of an input to the operation section coincides with a predetermined timing that is set; and
determining whether or not the input direction detected in the input direction detection step is the same as a predetermined direction that is set, wherein
the game progress includes progressing a game when at least one of a determination result of the timing determination step and a determination result of the direction determination step is positive.

16. The game processing method according to claim 9, wherein
the operation section includes a gyro sensor, and
the input direction detection step detects the input direction that is designated, based on the gyro sensor.

17. A game apparatus comprising:
an operation device having an operation section and a first display section;
a processing system, comprising a computer processor, the processing system being configured at least to execute:
an input direction detection to detect an input direction that is designated, based on input to the operation section;
an object control to, in accordance with the input direction, perform control such that an operation target object in a virtual space moves in a predetermined direction in the virtual space associated with the input direction;
a first virtual camera setting to set a first virtual camera for taking the operation target object in a first direction;
a second virtual camera setting to set a second virtual camera for taking the operation target object in a second direction which is substantially opposite to the first direction;
a first image generation to generate a first game screen, based on the first virtual camera;
a second image generation to generate a second game screen, based on the second virtual camera;
a first image transmission to transmit the first game screen to the operation device;
a second image output to output the second game screen to a second display device which is a device separate from the first display section;
a viewpoint switching to, at a predetermined timing based on game processing, in the virtual space, replace a direction in which the first virtual camera is set as seen from the operation target object and a direction in which the second virtual camera is set as seen from the operation target object with each other; and generation of an image shielding at least apart of an image of the virtual space taken by the first virtual camera, at predetermined timing based on game processing.

18. A non-transitory computer-readable storage medium having stored therein a game program which is executed by a computer of a game system that includes an operation device having an operation section and a first display section, the game program causing the computer to provide functionality comprising:

an input direction detection to detect an input direction that is designated, based on input to the operation section;

an object control to, in accordance with the input direction, perform control such that an operation target object in a virtual space moves in a predetermined direction in the virtual space associated with the input direction;

a first virtual camera setting to set a first virtual camera for taking the operation target object in a first direction;

a second virtual camera setting to set a second virtual camera for taking the operation target object in a second direction which is substantially opposite to the first direction;

a first image generation to generate a first game screen, based on the first virtual camera;

a second image generation to generate a second game screen, based on the second virtual camera;

a first image transmission to transmit the first game screen to the operation device;

a second image output to output the second game screen to a second display device which is a device separate from the first display section;

a viewpoint switching to, at a predetermined timing based on game processing, in the virtual space, replace a direction in which the first virtual camera is set as seen from the operation target object and a direction in which the second virtual camera is set as seen from the operation target object with each other; and generation of an shielding at least a part of an image of the virtual space taken by the first virtual camera, at a predetermined timing based on game processing.

* * * * *